Figure 1:
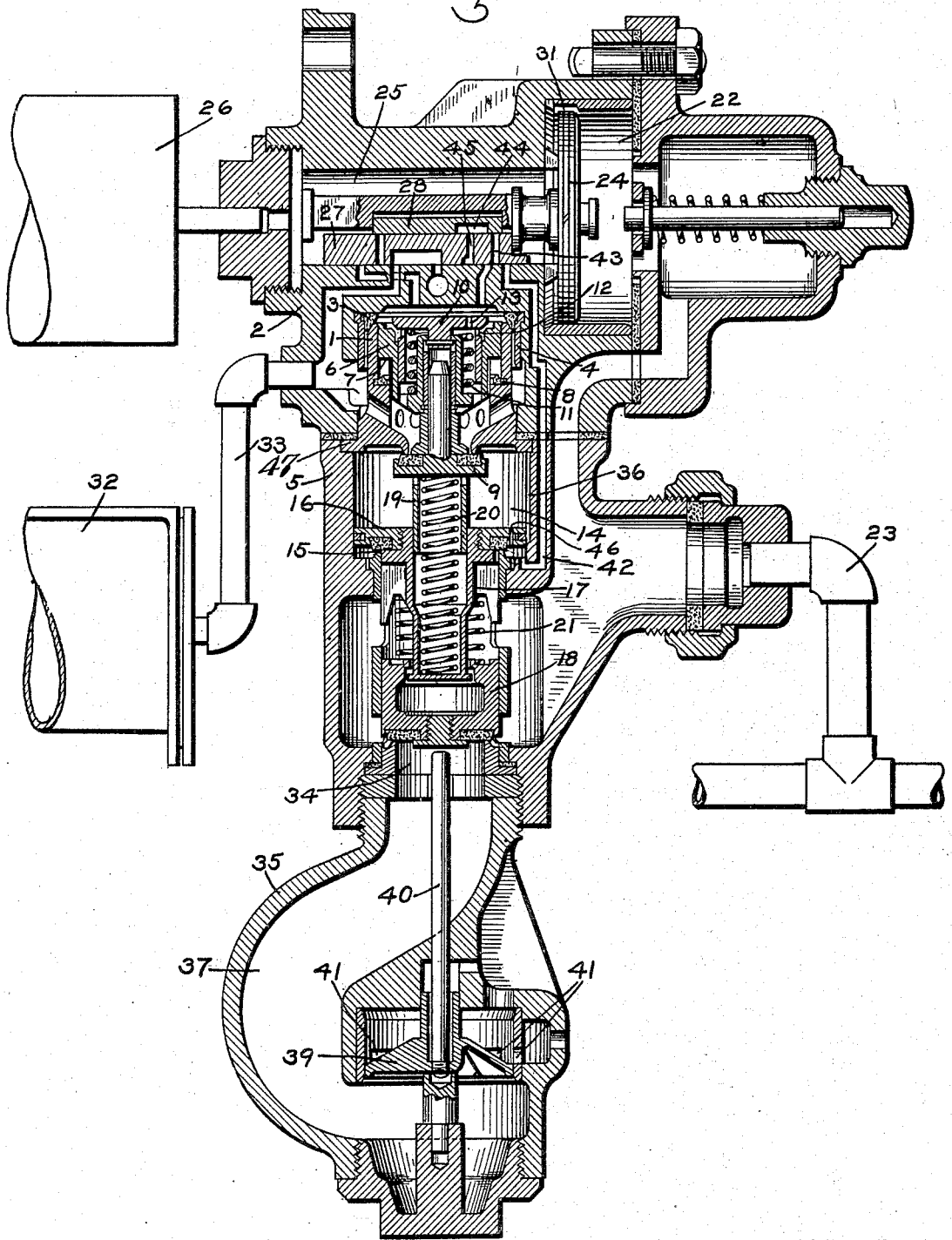

Nov. 11, 1924.    1,514,690

C. C. FARMER

TRIPLE VALVE DEVICE

Filed Sept. 13, 1922    2 Sheets-Sheet 1

INVENTOR
CLYDE C. FARMER
BY Wm. M. Cady
ATTORNEY

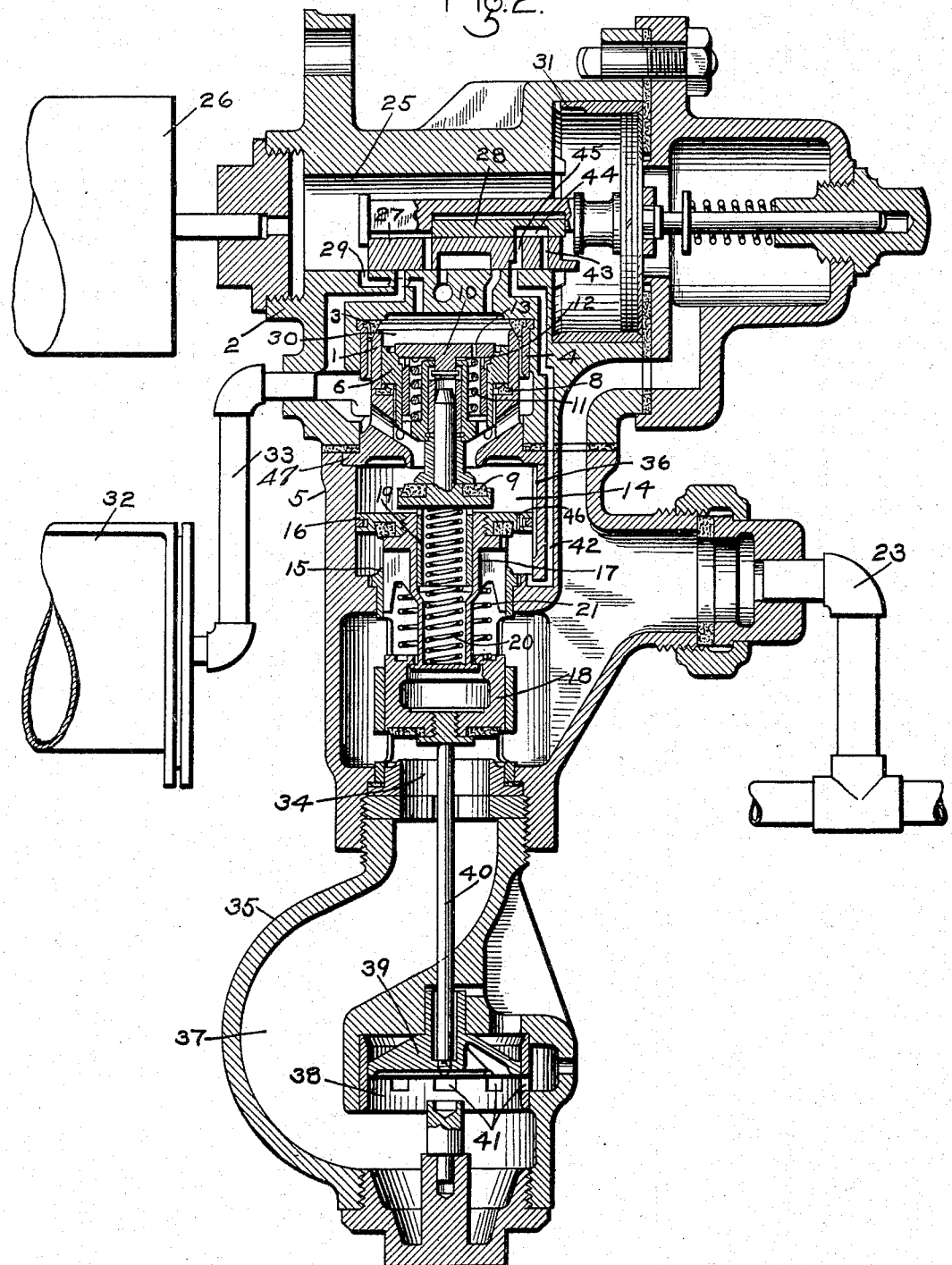

Patented Nov. 11, 1924.

1,514,690

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

TRIPLE-VALVE DEVICE.

Application filed September 13, 1922. Serial No. 587,901.

*To all whom it may concern:*

Be it known that I, CLYDE C. FARMER, a citizen of the United States, residing at Pittsburgh, in the county of Allegheny and State of Pennsylvania, have invented new and useful Improvements in Triple-Valve Devices, of which the following is a specification.

This invention relates to fluid pressure brakes and more particularly to a triple valve device.

One object of my invention is to provide means in a triple valve device or a valve device of similar character for securing a more nearly simultaneous and uniform brake application throughout the train in an emergency application of the brakes.

Another object of my invention is to provide a construction for accomplishing the above object which can be easily applied to existing triple valve devices in place of the usual quick action valve mechanism and without material change or alteration of the retained triple valve parts.

In order to accomplish the first mentioned object of the invention, means are provided for obtaining, in an emergency application of the brakes, first; a quick inshot of fluid under pressure from the brake pipe to the brake cylinder which assists in the quick serial venting of the brake pipe and produces enough pressure in the brake cylinder to effect the movement of the brake cylinder piston and the connected brake rigging to a position in which the brake shoes are lightly applied to the wheels, second; a slow build up of the brake cylinder pressure by fluid supplied from the auxiliary reservoir until a low predetermined brake cylinder pressure has been obtained on all the cars of the train, and finally; a more rapid build up of the brake cylinder pressure by an increased rate of flow from the auxiliary reservoir to the brake cylinder.

Other objects and advantages will appear in the following more detailed description of the invention.

In the accompanying drawings; Fig. 1 is a central sectional view of a triple valve device embodying my invention and showing the parts in normal release position; and Fig. 2 a similar view, showing the parts in emergency application position.

According to one feature of my invention, the improved valve mechanism is constructed so that it may be applied to an existing triple valve casing of the usual type in place of the usual emergency valve mechanism and comprises a cylindrical casing 1 adapted to be freely introduced into the emergency piston chamber of the usual triple valve casing 2. An annular gasket 3 is first fitted in the usual emergency piston bushing 4 at the upper portion and said gasket is provided with a conical surface adapted to be engaged by a corresponding conical surface on the casing 1. When the emergency casing 1 has been applied in position, the casing section 5 is applied to the triple valve casing 2 and the emergency casing 1 is then securely clamped in position by means of the flange 47 of the casing 1 and the casing 1 being pressed tightly against the gasket 3 prevents leakage of fluid under pressure around the emergency casing, it being necessary to prevent such leakage in order to secure reliable action of the valve mechanism.

In the casing 1 is mounted an emergency piston 6 having a section of reduced diameter so as to provide an annular seating face 7 adapted in emergency position to engage a seat ring 8. Secured to piston 6 is an emergency valve 9 and mounted in the piston is a check valve 10, subject to the pressure of a coil spring 11 and having a plurality of holes 12 in the barrel portion and a hole 13 through the face portion.

Mounted in valve chamber 14 and adapted to engage a seat ring 15 is a piston 16 having a downwardly extending stem 17 with a flange at the lower end which is adapted to engage a flange on a vent valve 18 when the piston 16 has moved a slight distance off its seat.

The valve 9 may be provided with a guide sleeve 19 which extends into a corresponding bore provided in the piston 16 and stem 17 and a coil spring 20 may be interposed between the valve 9 and the closing end of stem 17 for ensuring the seating of the valve 9 under certain conditions. A coil spring 21 may also be interposed between the piston 16 and the vent valve 18 to ensure the seating of the vent valve.

The triple valve casing 2 has the usual piston chamber 22 connected to the brake pipe 23 and containing piston 24 and valve chamber 25 connected to auxiliary reservoir 26 and containing main slide valve 27 and graduating valve 28 adapted to be operated by piston 24. The usual tail port in the main slide valve 27 through which fluid is supplied from the auxiliary reservoir to the brake cylinder in an emergency application is plugged, if my improvement is applied to an existing triple valve device, or is omitted in a new triple valve construction.

In operation, the valve chamber 25 and the auxiliary reservoir 26 are charged with fluid under pressure from the brake pipe through the usual feed groove 31 and brake pipe pressure acting on the exposed area of piston 16 lifts same from its seat, so that fluid from the brake pipe flows into chamber 14. When the chamber 14 has been charged to brake pipe pressure, less the tension of spring 20, the piston 16 again seats. The vent valve 18 is held seated by the brake pipe pressure acting on same.

Upon a sudden reduction in brake pipe pressure, the triple valve parts move to emergency position, as shown in Fig. 2, so that the main slide valve 27 uncovers a port 29 leading to the emergency piston chamber 30. Te emergency piston 6 then moves to its seat 8 and the check valve 10 seats in the piston 6. The movement of piston 6 opens the emergency valve 9 so that fluid in chamber 14 is vented to the brake cylinder 32 through pipe 33. The brake pipe pressure acting on the under side of the piston 16 then operates to unseat the piston, permitting fluid to be vented from the brake pipe to the brake cylinder.

When the piston 16 has moved sufficiently to take up the lost motion between the stem 17 and the vent valve 18, the vent valve will be opened by the further movement of the piston, so that fluid is vented from the brake pipe to passage 34 which is open to the atmosphere, assuming, for the moment, that the valve mechanism contained in the casing 35 is not employed. A plurality of by-pass grooves 36 are provided in the casing 5, which are so positioned, that communication is opened through the grooves around the piston 16 just as the vent valve 18 unseats, so that brake pipe pressure will be simultaneously vented to the brake cylinder and to the atmosphere and thus an excessive flow to the brake cylinder will be prevented.

In this manner, a quick inshot of pressure from the brake pipe into the brake cylinder is effected as well as a rapid discharge of brake pipe pressure directly to the atmosphere.

The quick inshot of fluid under pressure into the brake cylinder is sufficient to move the brake cylinder piston and the connected brake rigging to application position and apply the brakes with a light pressure which is such that the brakes will not be so heavily applied at the point of initial application as to permit the slack to run in with excessive force such as to cause damaging shocks.

When the brake pipe pressure has been reduced to a point at which the brake pipe pressure is substantially equal to the pressure in chamber 14 and in the brake cylinder, the piston 16 will move to its seat 15, thereby cutting off communication from the brake pipe to the brake cylinder. The movement of the piston 16 to its seat permits the vent valve 18 to seat so that further venting of fluid from the brake pipe to the atmosphere is cut off.

While the above action is taking place, fluid under pressure is slowly flowing from the auxiliary reservoir to the brake cylinder through the restricted port 13 in the check valve 10, said check valve being seated at this time and when the brake cylinder pressure has been increased by flow through the restricted port 13 to a point at which the brake cylinder pressure plus the pressure of spring 11 slightly exceeds the reduced auxiliary reservoir pressure acting in piston chamber 30, the check valve 10 will be unseated and then the auxiliary reservoir pressure will quickly equalize into the brake cylinder by flow through the ports 12 as well as through the port 13.

Upon substantial equalization of the auxiliary reservoir pressure acting on one side of the emergency piston 6 with the brake cylinder pressure acting on the opposite side, the spring 20 will move the valve 9 and the piston 6 to their normal closed positions.

If an emergency reduction in brake pipe pressure be made after a service application of the brakes, the valve 9 will be opened, and fluid will be vented from chamber 14 to the brake cylinder and the piston 16 will be operated to open the vent valve 18 as hereinbefore described, but since the brake cylinder pressure has already been built up to a certain point due to the previous service application of the brakes, a qualization of pressures on opposite sides of the piston 16 may take place and vent valve 18 may then close by reason of the piston 16 moving to its seat before the brake pipe pressure has been reduced to the low degree desired to ensure adequate quick serial action throughout the train.

In order to ensure that the vent valve 18 will remain open under the above circumstances until the brake pipe pressure has been reduced to the desired low point I may provide a valve device such as that shown incorporated in the casing 35.

Said casing is applied to the triple valve portion 5 and has a chamber 37 which connects with the vent port 34. Mounted in a piston chamber 38 of the casing 35 is a piston 39 having one side open to the chamber 37 and having a stem 40 adapted to engage the vent valve 18. Movement of piston 39 is adapted to open communication from chamber 36 to a plurality of ports 41 which are open to the atmosphere. In the operation of this feature of my invention, when the vent valve 18 is lifted from its seat upon an emergency reduction in brake pipe pressure, fluid from the brake pipe is admitted to the chamber 37 and acts on the under side of piston 39. Since the opposite side of the piston is at atmospheric pressure, the piston is moved upwardly by brake pipe pressure, the stem 40 following the movement of vent valve 18.

The vent valve 18 will now be held unseated by the stem 40 and piston 39, although the piston 16 may in the meanwhile move to its seat as hereinbefore described, until the brake pipe pressure has been reduced to substantially atmospheric pressure by flow through the ports 41, which are uncovered by the upward movement of the piston 39. The piston 39 will then return to its normal position, permitting the vent valve 18 to seat.

Quick serial venting of brake pipe pressure to the brake cylinder in service applications is provided for by extending the usual quick service vent port 42 through the casing section 5 so that said port opens in the chamber below the piston 16.

When a service application of the brakes is made, the triple valve parts move toward service position and the vent port 42 is connected to the brake cylinder through port 43, cavity 44 in the graduating valve 28, and port 45 to emergency piston chamber 30 and thence through the ports 12 around the check valve 10 to the brake cylinder 32. The venting of pressure in the space below piston 16 outside the seat 15, causes a flow of fluid from chamber 14 through a restricted port 46 in the piston 16 to the brake cylinder by way of the vent port 42, so that the higher brake pipe pressure acting on the inner seated area of the piston 16 operates to lift the piston from its seat, thereby establishing communication from the brake pipe to the brake cylinder, so that a quick serial venting of the brake pipe in a service application is effected.

Due to the lost motion between the stem 17 and the vent valve 18, the piston 16 can lift sufficiently to secure the quick service venting from the brake pipe without moving the vent valve 18, and without opening communication from the brake pipe to the chamber 14.

Having now described my invention, what I claim as new and desire to secure by Letters Patent, is:

1. In a fluid pressure brake, the combination with a brake cylinder, auxiliary reservoir, and brake pipe, of a valve movable by fluid pressure for closing a communication through which fluid is supplied from the auxiliary reservoir to the brake cylinder and means operated upon a sudden reduction in brake pipe pressure for supplying fluid from the auxiliary reservoir to said valve.

2. In a fluid pressure brake, the combination with a brake cylinder, auxiliary reservoir, and brake pipe, of valve means operated by auxiliary reservoir pressure for closing a communication through which fluid is supplied from the auxiliary reservoir to the brake cylinder, an always open restricted port through which fluid is supplied from the auxiliary reservoir to the brake cylinder, and means operated upon a sudden reduction in brake pipe pressure for supplying fluid from the auxiliary reservoir to said valve means, and through said restricted port to the brake cylinder.

3. In a fluid pressure brake, the combination with a brake cylinder, auxiliary reservoir, and brake pipe, of valve means operated by auxiliary reservoir pressure for closing a communication from the auxiliary reservoir to the brake cylinder and subject on one side to brake cylinder pressure and the pressure of a spring and means operated upon a sudden reduction in brake pipe pressure for supplying fluid from the auxiliary reservoir to said valve means and through a restricted port to the brake cylinder.

4. In a fluid pressure brake, the combination with a brake cylinder, auxiliary reservoir, and brake pipe, of a valve subject on one side to brake cylinder pressure and the pressure of a spring for controlling a communication through which fluid is supplied from the auxiliary reservoir to the brake cylinder and means operated upon a sudden reduction in brake pipe pressure for supplying fluid from the auxiliary reservoir to the opposite side of said valve and through a restricted port to the brake cylinder.

5. In a fluid pressure brake, the combination with a brake cylinder, auxiliary reservoir, and brake pipe, of means subject to the opposing pressures of the auxiliary reservoir and brake cylinder and operated by auxiliary reservoir pressure in an emergency application of the brakes for first closing a communication through which fluid is supplied from the auxiliary reservoir to the brake cylinder and then operated upon a predetermined increase in brake cylinder pressure above the pressure at which the brake pipe and the brake cylinder are adapted to equalize for opening said communication.

6. In a fluid pressure brake, the combination with a brake cylinder, auxiliary reservoir, and brake pipe, of a valve subject on one side to auxiliary reservoir pressure and on the opposite side to brake cylinder pressure and the pressure of a spring for controlling a communication through which fluid is supplied from the auxiliary reservoir to the brake cylinder in an emergency application of the brakes.

7. In a fluid pressure brake, the combination with a brake cylinder, auxiliary reservoir, and brake pipe, of an emergency piston and a valve in said piston for controlling a communication through which fluid is supplied from the auxiliary reservoir to the brake cylinder and means operated upon a sudden reduction in brake pipe pressure for supplying fluid from the auxiliary reservoir to said valve for operating the valve to close said communication.

8. In a fluid pressure brake, the combination with a brake cylinder, auxiliary reservoir, and brake pipe, of an emergency piston and a valve in said piston subject on one side to brake cylinder pressure for controlling a communication through which fluid is supplied from the auxiliary reservoir to the brake cylinder and means operated upon a sudden reduction in brake pipe pressure for supplying fluid from the auxiliary reservoir to the opposite side of said valve for closing said communication.

9. In a fluid pressure brake, the combination with a brake cylinder, auxiliary reservoir, and brake pipe, of a casing having a piston chamber, an emergency piston in said chamber, a valve mounted in said piston and subject on one side to brake cylinder pressure and the pressure of a spring, and means operated upon a sudden reduction in brake pipe pressure for supplying fluid from the auxiliary reservoir to said chamber.

10. In a fluid pressure brake, the combination with a brake cylinder, auxiliary reservoir, and brake pipe, of a casing having a piston chamber, an emergency piston in said chamber, a valve mounted in said piston and subject on one side to brake cylinder pressure and the pressure of a spring, and means operated upon a sudden reduction in brake pipe pressure for supplying fluid from the auxiliary reservoir to said chamber, and through a restricted port in said valve to the brake cylinder.

11. In a fluid pressure brake, the combination with a brake cylinder, auxiliary reservoir, and brake pipe, of a casing having a piston chamber, a bushing mounted in said chamber, a piston cylinder mounted in said bushing, an emergency piston in said cylinder, a valve mounted in said piston for controlling a communication from the auxiliary reservoir to the brake cylinder, and means operated upon a sudden reduction in brake pipe pressure for supplying fluid from the auxiliary reservoir to said piston and valve.

12. In a fluid pressure brake, the combination with a triple valve casing having an emergency piston chamber, of a gasket mounted in said chamber, a piston cylinder engaging said gasket to prevent leakage of fluid around said cylinder, and an emergency piston mounted in said cylinder.

13. In a fluid pressure brake, the combination with a triple valve casing having an emergency piston chamber, of a gasket mounted in said chamber, a piston cylinder seating on said gasket, and an emergency piston mounted in said cylinder.

14. In a fluid pressure brake, the combination with a triple valve casing having an emergency piston chamber, a gasket mounted in said chamber and having an inclined seating face, a piston cylinder mounted in said chamber and having a corresponding inclined face engaging the inclined face of the gasket, and an emergency piston mounted in said cylinder.

15. In a fluid pressure brake, the combination with a triple valve casing having an emergency piston chamber, an emergency piston in said chamber, a valve chamber, an emergency valve in said chamber adapted to be operated by said piston, and valve means in said valve chamber for controlling communication from the brake pipe to the brake cylinder.

16. In a fluid pressure brake, the combination with a triple valve casing having an emergency piston chamber, an emergency piston in said chamber, a valve chamber, an emergency valve in said chamber adapted to be operated by said piston, valve means in said valve chamber for controlling communication from the brake pipe to the brake cylinder, and a vent valve operated by said valve means for venting fluid from the brake pipe to the atmosphere.

17. In a fluid pressure brake, the combination with a triple valve casing having an emergency piston chamber, an emergency piston in said chamber, means associated with said piston for controlling the supply of fluid from the auxiliary reservoir to the brake cylinder, a valve chamber, valve means in said chamber for controlling communication from the brake pipe to the brake cylinder, a vent valve operated by said valve means for venting fluid from the brake pipe to the brake cylinder, and an emergency valve operated by said emergency piston for venting fluid from said valve chamber to effect the operation of said valve means.

18. In a fluid pressure brake, the combination with a brake pipe, of a vent valve operated upon a sudden reduction in brake pipe pressure for venting fluid from the brake pipe to the atmosphere, and an auxiliary device for maintaining said vent valve in its open position.

19. In a fluid pressure brake, the combination with a brake pipe, of a vent valve operated upon a sudden reduction in brake pipe pressure for venting fluid from the brake pipe to the atmosphere, a piston subject to the opposing pressures of the brake pipe and the atmosphere and means operated by said piston for maintaining said vent valve in its open position.

20. In a fluid pressure brake, the combination with a brake pipe, of a vent valve operated upon a sudden reduction in brake pipe pressure for venting fluid from the brake pipe to the atmosphere, a piston subject on one side to fluid vented from the brake pipe upon the opening of said vent valve and on the opposite side to the atmospheric pressure, and a stem operated by said piston and adapted to engage said vent valve.

21. In a fluid pressure brake, the combination with a brake pipe, of a vent valve operated upon a sudden reduction in brake pipe pressure for venting fluid from the brake pipe to the atmosphere, a piston subject on one side to fluid vented from the brake pipe upon the opening of said vent valve and on the opposite side to the atmospheric pressure and operated by brake pipe pressure for opening communication from the brake pipe to the atmosphere, and means operated by said piston for maintaining said vent valve in its open position.

22. In a fluid pressure brake, the combination with a brake pipe, of a vent valve operated upon a sudden reduction in brake pipe pressure for venting fluid from the brake pipe to the atmosphere and means operated by the flow of fluid from the brake pipe upon the opening of said vent valve for maintaining said vent valve in its open position.

23. In a fluid pressure brake, the combination with a brake pipe, of a vent valve operated upon a sudden reduction in brake pipe pressure for venting fluid from the brake pipe to the atmosphere and means operated by the flow of fluid from the brake pipe to the atmosphere upon the opening of said vent valve for maintaining said vent valve in its open position.

24. In a fluid pressure brake, the combination with a brake cylinder, brake pipe, and a triple valve device having means for venting fluid from the brake pipe to the brake cylinder in a service application of the brakes and including a quick service port, of a vent valve for venting fluid from the brake pipe, and a piston operated upon a sudden reduction in brake pipe pressure for operating said vent valve and adapted to control communication from the brake pipe to said quick service port.

25. In a fluid pressure brake, the combination with a brake cylinder, brake pipe and a triple valve device having means for venting fluid from the brake pipe to the brake cylinder in a service application of the brakes and including a quick service port, of a vent valve for venting fluid from the brake pipe, and a piston operated upon a sudden reduction in brake pipe pressure for operating said vent valve and having a movement relative to said vent valve for opening communication from the brake pipe to said quick service port.

26. In a fluid pressure brake, the combination with a brake cylinder, brake pipe, and a triple valve device having means for venting fluid from the brake pipe to the brake cylinder in a service application of the brakes and including a quick service port, of a vent valve for venting fluid from the brake pipe, and a piston having a movement relative to said vent valve for opening communication from the brake pipe to said quick service port and adapted upon a further movement to open said vent valve.

27. In a fluid pressure brake, the combination with a brake cylinder, brake pipe, and a triple valve device having means for venting fluid from the brake pipe to the brake cylinder in a service application of the brakes and including a quick service port, of a vent valve for venting fluid from the brake pipe, and a piston having a movement relative to said vent valve for opening communication from the brake pipe to said quick service port and adapted upon a further movement to open said vent valve and also establish communication from the brake pipe to the brake cylinder.

In testimony whereof I have hereunto set my hand.

CLYDE C. FARMER.